US008557125B2

(12) United States Patent
Suresh et al.

(10) Patent No.: US 8,557,125 B2
(45) Date of Patent: Oct. 15, 2013

(54) TREATMENT ADDITIVES, METHODS FOR MAKING AND METHODS FOR CLARIFYING AQUEOUS MEDIA

(75) Inventors: Seethalakshmi Suresh, Bangalore (IN); Stephen Robert Vasconcellos, Doylestown, PA (US); Narain Madhavan, Bangalore (IN); Baraka Kawawa, Bensalem, PA (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 12/795,174

(22) Filed: Jun. 7, 2010

(65) Prior Publication Data
US 2011/0297622 A1 Dec. 8, 2011

(51) Int. Cl.
*B03D 3/02* (2006.01)
*C08F 251/00* (2006.01)
*C08B 37/08* (2006.01)

(52) U.S. Cl.
USPC ............. 210/733; 210/732; 210/734; 536/20; 527/314

(58) Field of Classification Search
USPC ............. 210/732, 733, 734; 536/20; 527/314
See application file for complete search history.

(56) References Cited

U.S. PATENT DOCUMENTS 5,142,010 A * 8/1992 Olstein .......................... 526/248
6,020,422 A 2/2000 Connors et al.
6,417,268 B1 * 7/2002 Zhang et al. .................. 524/833
6,887,935 B2 * 5/2005 Peltier et al. .................. 524/829
2006/0151396 A1 7/2006 Ren et al.

FOREIGN PATENT DOCUMENTS

DE 19800610 A1 7/1999
EP 1 236 748 A1 9/2002

OTHER PUBLICATIONS

Titled Synthesis and Characterization of a Novel Cationic Chitosan Based Flocculant with a High Water Solubility for Pulp Mill Wastewater Treatment to Wang et al., Water Research 43 (2009), 5267-5275.*
Jian-Ping Wang et al, "A novel efficient cationic flocculant prepared through grafting two monomers onto chitosan induced by Gamma radiation", Jan. 1, 2012, RSC Advances.
Wang et al, "Optimization of coagulation-flocculation process for a paper-recycling wastewater treatment using response surface methodology", May 11, 2007, pp. 204-210, vol. 302, No. 1-3, Colloids and Surfaces, A, Physicachemical and Engineering Aspects, Elsevier, Amsterdam, NL.
Renault F et al, "Chitosan for coagulation/flocculation processes—An eco-friendly approach", May 1, 2009, pp. 1337-1348, vol. 45, No. 5, European Polymer Journal, Pergamon Press Ltd. Oxford, GB.
Search Report and Written Opinion from WO Application No. PCT/US2011/037109 dated Dec. 13, 2011.
Graft Copolymerization of Hydroxyethyl Methacrylate onto Chitosan; Khaled El-Tahlawy and Samuel M Hudson; Journal of Applied Polymer Science, vol. 82, 683-702 (2001).

(Continued)

*Primary Examiner* — James J Seidleck
*Assistant Examiner* — Peter A Salamon
(74) *Attorney, Agent, or Firm* — Wegman, Hessler & Vanderburg

(57) ABSTRACT

A coagulant composition includes chitosan, methacryloyloxyethyltrimethyl ammonium methyl sulfate and a redox initiator. A coagulant, method for making the coagulant and clarifying wastewater is also provided.

11 Claims, 1 Drawing Sheet

(56) References Cited

OTHER PUBLICATIONS

Modified Chitosan. I. Optimized Cerium Ammonium Nitrate-Induced Synthesis of Chitosan-graft-Polyacrylonitrile; A. Pourjavadi, G.R. Mahdavinia, M.J. Zohuriaan-Mehr, H. Omidian; Journal of Applied Polymer Science, vol. 88, 2048-2054 (2003).

Graft Polymerization of Chitosan with Butyl Acrylate and Application of the Copolymers to Cotton Fabric; A. El-Shafei, S. Shaarawy and A. Hebeish; Polymer-Plastics Technology and Engineering, 44:8, 1523-1535 (2005).

Synthesis of a Well-Defined Chitosan Graft Poly(methoxy polyethyleneglycol methacrylate) by Atom Transfer Radical Polymerization; K. El Tahlawy and S. M. Hudson; Journal of Applied Polymer Science, vol. 89, 901-912 (2003).

Preparation and Characterization of Poly(2-acrylamido-2-methylpropane-sulfonic acid) Grafted Chitosan Using Potassium Persulfate as Redox Initiator; Abduel Majid K. Najjar, Wan MD Zin Wan Yunus, Mansor B. Ahmad, Mohamad Zaki AB. Rahman; Journal of Applied Polymer Science, vol. 77, 2314-2318 (2000).

Study of Radiation-Induced Graft Copolymerization of Butyl Acrylate onto Chitosan in Acetic Acid Aqueous Solution; Li Yu; Yu He; Liang Bin; Fang Yue'e; Journal of Applied Polymer Science, vol. 90, 2855-2860 (2003).

Studies on graft copolymerization of 2-hydroxyethyl acrylate onto chitosan; Grigoriy A. Mun, Zauresh S. Nurkeeva, Sergey A. Dergunov, Irina K. Nam, Tauzhan P. Maimakov, Erengaip M. Shaikhutdinov, Sang Cheon Lee, Kinam Park; Reactive & Functional Polymers 68 (2008) 389-395.

\* cited by examiner

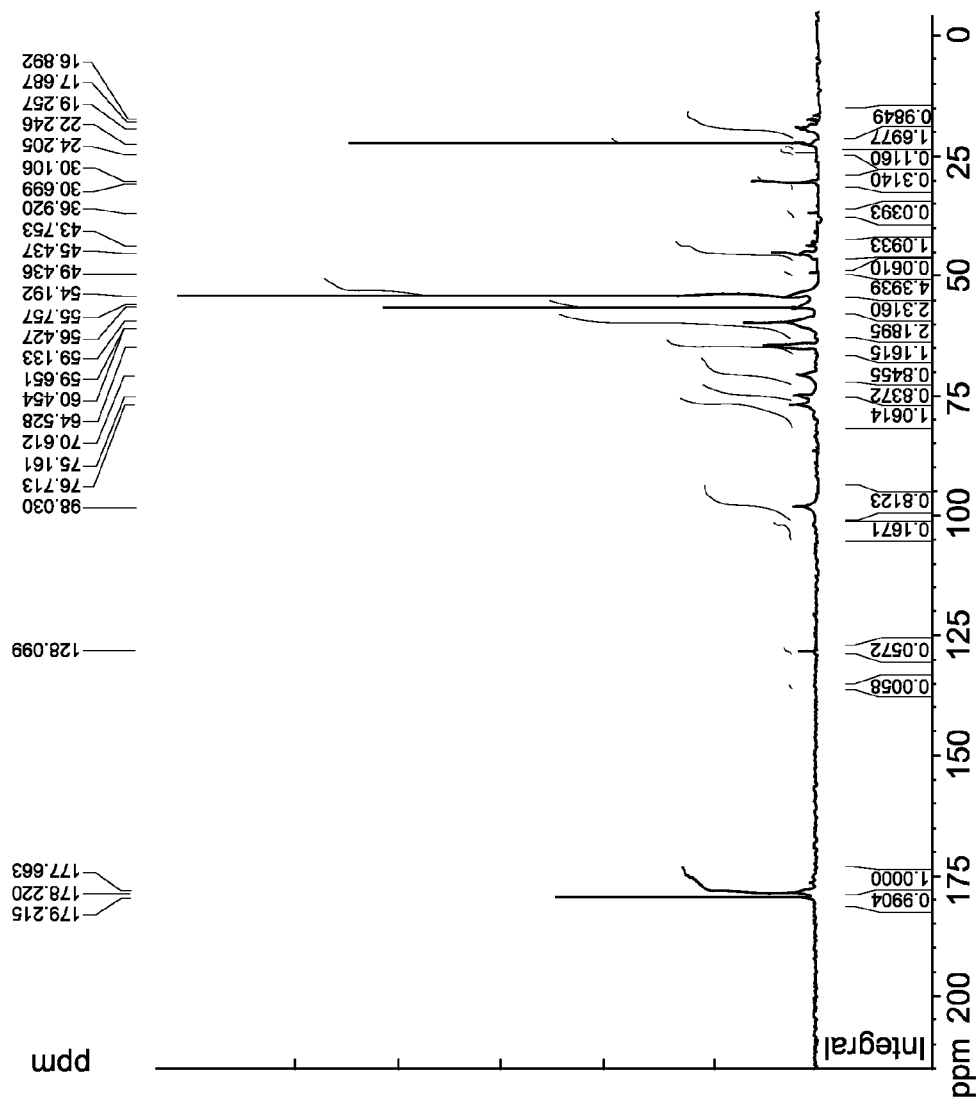

TREATMENT ADDITIVES, METHODS FOR MAKING AND METHODS FOR CLARIFYING AQUEOUS MEDIA

FIELD OF THE INVENTION

This invention relates to methods and treatment additives for treating aqueous media and more particularly, to methods and treatment additives for clarifying aqueous media.

BACKGROUND OF THE INVENTION

Wastewater, such as from food and beverage processing, transportation processing or steel mill processing, often contains suspended matter, which must be removed to provide suitable water for use in domestic and industrial applications. Raw influent water, such as from lakes, streams and rivers can also contain suspended material. The suspended matter may contain large solids that are easily removed by settling, and other suspended materials that are not easily removed by settling, such as dispersed colloids or colloidal oils. Suspended materials are typically removed by clarification, which includes the steps of coagulation, flocculation and sedimentation.

Additives containing chitosan have been used to enhance clarification, but the effectiveness was limited, as chitosan has low water solubility and low cationic charge. Larger amounts of chitosan in the additive cause the additives to become insoluble in the aqueous media.

It is desirable to improve clarification methods for removing suspended material by providing improved and environmentally-friendly additives and methods.

BRIEF DESCRIPTION OF THE INVENTION

In one embodiment, a coagulant includes poly-(METAS)-Chitosan polymer having repeating units of:

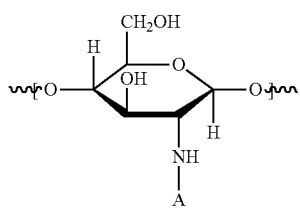

wherein A has the formula of:

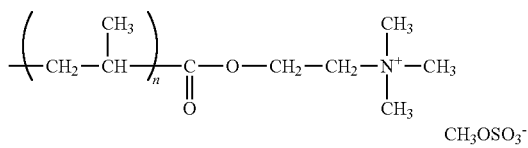

and n is an integer from 50 to 5000.

In another embodiment, a coagulant composition includes chitosan, methacryloyloxyethyltrimethyl ammonium methyl sulfate and redox initiators.

In another embodiment, a method for making a coagulant includes polymerizing 2-methacryloyloxyethyltrimethyl ammonium methyl sulfate and chitosan in the presence of redox initiators.

In another embodiment, a method for clarifying aqueous media includes adding a coagulant to the aqueous media, wherein said coagulant includes poly(METAS)-Chitosan.

The various embodiments provide a chloride-free and environmentally-friendly coagulant and process for clarifying oily aqueous media and synthesis of a poly(METAS)-chitosan coagulant.

BRIEF DESCRIPTION OF DRAWINGS

FIG. 1 is an NMR for the poly(METAS)-Chitosan polymer prepared in Example 1.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a coagulant includes a polymer, poly(METAS)-Chitosan. In another embodiment, poly(METAS)-Chitosan has repeating units of:

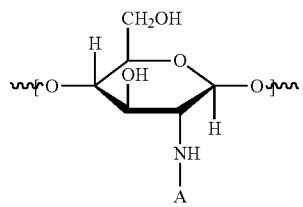

wherein A has the formula of:

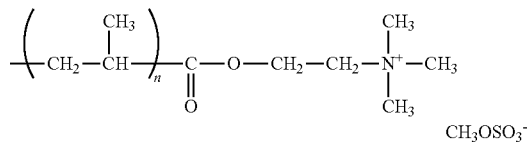

and wherein n is an integer from 50 to 5000. In another embodiment, n is an integer from 100 to 1000. In another embodiment, n is an integer from 100 to 500.

In one embodiment, poly(METAS)-Chitosan polymer has a viscosity measured at 25° C. in the range of from about 500 cps to about 3000 cps. In another embodiment, the poly(METAS)-Chitosan polymer has a viscosity in the range of from about 500 cps to about 2000 cps. In another embodiment, the poly(METAS)-Chitosan polymer has a viscosity in the range of from about 500 cps to about 1500 cps.

In one embodiment, the poly(METAS)-Chitosan polymer includes 2-methacryloyloxyethyltrimethyl ammonium methyl sulfate groups grafted onto a chitosan backbone. The grafted groups improve the performance of the chitosan polymer by increasing the percent actives of the product while maintaining the solubility of the product in water at high mole ratios of chitosan.

The coagulant aids in clarifying aqueous media. In one embodiment, the aqueous media may be any type of oily aqueous media or aqueous media containing colloidal or suspended materials. In one embodiment, the aqueous media may be raw water, storm water or wastewater. In one embodiment, the wastewater may be from food and beverage processing, transportation processing or steel mill processing.

In another embodiment, a coagulant composition includes chitosan methacryloyloxyethyltrimethyl ammonium methyl sulfate and redox initiators.

Chitosan is a linear polysaccharide containing deacetylated units and acetylated units. In one embodiment, the deacetylated unit may be β-(1-4)-linked D-glucosamine in another embodiment, the acetylated unit may be N-acetyl-D-glucosamine units. Chitosan may be prepared by deacylating chitin with a strong alkali and is available commercially from India Sea Foods. Chitosan may be present from about 5 percent by weight to about 30 percent by weight, based on the weight of the composition. In another embodiment, chitosan may be present from about 10 percent by weight to about 30 percent by weight, based on the weight of the composition. In another embodiment, chitosan may be present from about 20 percent by weight to about 30 percent by weight, based on the weight of the composition.

2-Methacryloyloxyethyltrimethyl ammonium methyl sulfate is available commercially, such as from Ciba. 2-Methacryloyloxyethyltrimethyl ammonium methyl sulfate may be present from about 25 percent by weight to about 75 percent by weight, based on the weight of the composition. In another embodiment, 2-Methacryloyloxyethyltrimethyl ammonium methyl sulfate may be present from about 30 percent by weight to about 70 percent by weight, based on the weight of the composition. In another embodiment, 2-Methacryloyloxyethyltrimethyl ammonium methyl sulfate may be present from about 35 percent by weight to about 65 percent by weight, based on the weight of the composition.

The redox initiators provide the oxidizing and reducing agents that are needed to form radicals to polymerize the chitosan-based polymer. In one embodiment, the redox initiator includes an oxidizing agent and a reductant. In another embodiment, the oxidizing agent ma be t-butyl hydroperoxide or potassium persulfate. In another embodiment, the reductant may be sodium metabisulfite, sodium hydrosulfate or sodium thiosulfate. The redox initiators may be present from about 1 percent by weight to about 10 percent by weight, based on the weight of the composition. In another embodiment, the redox initiators may be present from about 3 percent by weight to about 7 percent by weight, based on the weight of the composition, in one embodiment, the oxidizing agent may be present from about 0.5 percent by weight to about 5 percent by weight, based on the weight of the composition. In another embodiment, the oxidizing agent may be present from about 1 percent by weight to about 5 percent by weight, based on the weight of the composition. In one embodiment, the reductant may be present from about 0.5 percent by weight to about 5 percent by weight, based on the weight of the composition. In another embodiment, the reductant may be present from about 1 percent by weight to about 5 percent by weight, based on the weight of the composition.

In one embodiment, the composition includes from about 5 percent by weight to about 30 percent by weight chitosan, from about 25 percent by weight to about 75 percent by weight of 2-methacryloyloxyethyltrimethyl ammonium methyl sulfate and from about 1 percent by weight to about 10 percent by weight of redox initiators, wherein the weights are based on the total weight of the composition.

In another embodiment, an acid may be added. The acid helps to increase grafting by dissolving the chitosan to prepare a homogenous solution. In one embodiment, the acid may include citric acid, acetic acid, methanesulfonic acid or sulfamic acid. In one embodiment, the acid is present from about 10 percent by weight to about 50 percent by weight, based on the weight of the composition. In another embodiment, the acid may be present from about 10 percent by weight to about 30 percent by weight, based on the weight of the composition. In another embodiment, the acid may be present from about 10 percent by weight to about 20 percent by weight, based on the weight of the composition.

In another embodiment, a method for making a coagulant includes polymerizing 2-methacryloyloxyethyltrimethyl ammonium methyl sulfate and chitosan in the presence of redox initiators.

Chitosan is described above. In one embodiment, chitosan may be present from about 5 percent by weight to about 30 percent by weight, based on the weight of the reactants. In another embodiment, chitosan may be present from about 10 percent by weight to about 30 percent by weight, based on the weight of the reactants. In another embodiment, chitosan may be present from about 20 percent by weight to about 30 percent by weight, based on the weight of the reactants.

In one embodiment, chitosan is polymerized with 2-methacryloyloxyethyltrimethyl ammonium methyl sulfate. The chitosan forms a backbone to which the 2-methacryloyloxyethyltrimethyl ammonium methyl sulfate is grafted. In one embodiment, 2-methacryloyloxyethyltrimethyl ammonium methyl sulfate may be present from about 25 percent by weight to about 75 percent by weight, based on the weight of the reactants. In another embodiment, 2-methacryloyloxyethyltrimethyl ammonium methyl sulfate may be present from about 30 percent by weight to about 70 percent by weight, based on the weight of the reactants. In another embodiment, 2-methacryloyloxyethyltrimethyl ammonium methyl sulfate may be present from about 35 percent by weight to about 65 percent by weight, based on the weight of the reactants.

In one embodiment, the chitosan and 2-methacryloyloxyethyltrimethyl ammonium methyl sulfate are polymerized in the presence of redox initiators, which are described above. The redox initiators may be present from about percent by weight to about 10 percent by weight, based on the weight of the reactants. In one embodiment, the redox initiators may be present from about 3 percent by weight to about 7 percent by weight, based on the weight of the reactants. In one embodiment, the redox initiators includes an oxidizing agent and a reductant, which are described above. In one embodiment, the oxidizing agent may be present from about 0.5 percent by weight to about 5 percent by weight, based on the weight of the reactants. In another embodiment, the oxidizing agent may be present from about 1 percent by weight to about 5 percent by weight, based on the weight of the reactants. In another embodiment, the reductant may be present from about 0.5 percent by weight to about 5 percent by weight, based on the weight of the reactants. In another embodiment, the reductant may be present from about 1 percent by weight to about 5 percent by weight, based on the weight of the reactants.

The chitosan and 2-methacryloyloxyethyltrimethyl ammonium methyl sulfate may be polymerized in any suitable manner. In one embodiment, the polymerization may be at an elevated temperature. In another embodiment, the polymerization may occur at a temperature from about 40° C. to about 90° C. In another embodiment, the temperature of the polymerization may be from about 40° C. to about 85° C. In another embodiment, the temperature may be from about 50° C. to about 80° C.

In one embodiment, the coagulant polymer may be prepared in a single reactor. In one embodiment, the reaction may occur in an aqueous solution. In another embodiment, the aqueous solution may be water.

In one embodiment, the resulting polymer is poly(METAS)-Chitosan. In another embodiment, the polymer has repeating units of:

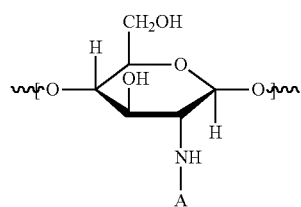

wherein A has the formula of:

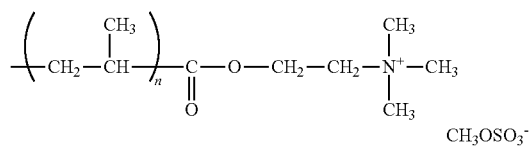

and wherein n is an integer from 50 to 5000. In another embodiment, n is an integer from 100 to 1000. In another embodiment, n is an integer from 100 to 500.

In one embodiment, poly(METAS)-Chitosan polymer has a viscosity measured at 25° C. in the range of from about 500 cps to about 3000 cps. In another embodiment, the poly(METAS)-Chitosan polymer has a viscosity in the range of from about 500 cps to about 2000 cps. In another embodiment, the poly(METAS)-Chitosan polymer has a viscosity in the range of from about 500 cps to about 1500 cps.

In another embodiment, chitosan and 2-methacryloyloxyethyltrimethyl ammonium methyl sulfate may be polymerized in the presence of an acid. The acid helps to increase grafting by dissolving the chitosan to prepare a homogenous solution. In one embodiment, the acid may include citric acid, acetic acid, methanesulfonic acid or sulfamic acid. In another embodiment, the acid is present from about 10 percent by weight to about 50 percent by weight, based on the weight of the reactants. In another embodiment, the acid is present from about 10 percent by weight to about 30 percent by weight, based on the weight of the reactants. In another embodiment, the acid is present from about 10 percent by weight to about 20 percent by weight, based on the weight of the reactants.

In another embodiment, a method for clarifying aqueous media includes adding a coagulant to the aqueous media, wherein said coagulant includes poly(METAS)-Chitosan.

In one embodiment, the aqueous media may be any type of oily aqueous media or aqueous media containing colloidal or suspended materials. In one embodiment, the aqueous media may be raw water, storm water or wastewater. In one embodiment, the wastewater may be from food and beverage processing, transportation processing or steel mill processing. In one embodiment, the wastewater may contain dispersed colloids or colloidal oils. The wastewater may contain any amount of colloidal material or oily material and any amount of colloidal material or oily material may be removed by the coagulant, in one embodiment, the wastewater may contain from about 0.01 percent by weight to about 4 percent by weight of colloidal material or oily material, based on the weight of the water.

The coagulant and poly(METAS)-Chitosan are described above. The coagulant may be added in any suitable manner. In one embodiment, the coagulant is injected into the aqueous media. In another embodiment, the coagulant is added via dilution with a chemical feed pump, such as an LMI pulse pump. In one embodiment, the coagulant is added in a continuous manner.

In one embodiment, the coagulant is added to the aqueous media in any amount suitable for clarifying the aqueous media. In one embodiment, the coagulant may be added in an mount of from about 0.5 ppm by volume to about 1000 ppm by volume, based on the volume of the aqueous media. In another embodiment, the coagulant may be added in an amount of from about 1 ppm by volume to about 1000 ppm by volume, based on the volume of the aqueous media. In another embodiment, the coagulant may be added in an amount of from about 100 ppm by volume to about 1000 ppm by volume, based on the volume of the aqueous media. In another embodiment, the coagulant may be added in an amount of from about 200 ppm by volume to about 950 ppm by volume, based on the volume of the aqueous media.

In order that those skilled in the art will be better able to practice the present disclosure, the following examples are given by way of illustration and not by way of limitation.

EXAMPLES

Example 1

A 4-necked flask was equipped with a mechanical stirrer, reflux condenser, thermometer socket and nitrogen inlet. 250.00 g of deionized water was charged to the reactor flask. The flask was stirred at 300-350 rpm and a nitrogen blanket was applied. The reaction mass was heated to 25-30° C. 21 g of Chitosan was added to the flask. The flask was heated to 72-75° C. 12 g of glacial acetic acid was added to the Chitosan. The mixture was stirred for 60 minutes and then cooled to 35-40° C. 50 g of 2-Methacryloyloxyethyltrimethylammonium methyl sulfate solution was added to the flask and nitrogen sparged for 20 minutes. The flask was heated to 73-75° C. and a sodium metabisulfite solution (2.05 g in 8.72 g of water) and t-butyl hydroperoxide (t-BHP) (2.68 g in 8.32 g of water) were charged to the flask solution simultaneously over a period of 1 hour via syringe pump. The temperature was maintained at 73-75° C. and held at that temperature for 1 hour. The mixture was cooled to room temperature. The resulting polymer yielded a homogeneous viscous light-yellowish solution of poly(METAS)-Chitosan having 12% wt. solids.

The viscosity of the resulting polymer was measured using a standard Brookfield viscometer, DVII, Spindle 61 at 25° C. and 30 rpm. The resulting polymer had a viscosity of 700 cps. The presence of an ester group in infrared spectroscopy after purification confirms the grafting process and an NMR confirms the polymer structure as shown in FIG. 1.

Example 2

A synthetic only wastewater was prepared. An oily mixture was prepared by blending mineral oil, oleic acid and Triton- CFI0, which is a linear alcohol ethoxylate and commercially available from The Dow Chemical Company. The mixture contained 43% mineral oil, 37% oleic acid and 20% triton-CF10. The mixture was stirred on a hot plate for 15 minutes followed by blending the mixture in a blender for 10 minutes 15 g of the oily mixture was added to a blender with 385 g of distilled water and blended for seven minutes. The resulting emulsion was diluted to 1:9 by volume using tap water. The pH of the wastewater was 7.0.

An ASTM D2035-80 testing procedure was used to determine the efficacy of the treatment. Wastewater amples were added to six 300-ml jars and placed in six-paddle stirrer. The treatment coagulant as prepared in Example 1 was added to the jars in the dosages shown in Table 2. The samples were stirred at a speed of 100 rpm for two minutes and at a speed of 35 rpm for 10 minutes. Then the speed was reduced to 0 rpm and a testing sample was taken from the bottom of the jar after 30 minutes. The testing sample was measured using a turbidity meter. The turbidity of the testing sample was noted and compared to the turbidity of a blank sample with no coagulant treatment, which had a turbidity of 4186. Data is shown in Table 2.

TABLE 2

| Sample | Treatment (ppm per dose) | Turbidity (NTU) |
| --- | --- | --- |
| Blank | 0 | 4186? |
| 1 | 233.3 | 39.3 |
| 2 | 333.3 | 48.7 |
| 3 | 400 | 41.3 |
| 4 | 533.3 | 38.6 |
| 5 | 600 | 29.6 |
| 6 | 700 | 41.5 |
| 7 | 800 | 52.7 |
| 8 | 933.3 | 66.2 |

The turbidity significantly decreases with the addition of the treatment coagulant.

Example 3

Wastewater from the Effluent Treatment Plant of a Refinery was tested in accordance with Example 2. The wastewater had a pH of 10.9, a conductivity of 1365, a Total Dissolved Solids (TDS) of 946.4 and a turbidity of 200. Data is shown in Table 3,

TABLE 3

| Treatment (ppm per dose) | Turbidity (FAU[1]) |
| --- | --- |
| 0 | 200 |
| 3.3 | 58 |
| 6.6 | 60 |
| 9.9 | 73 |
| 13.2 | 76 |

[1]FAU is Formazin Attenuation Unit

The treatment significantly reduced the turbidity.

Example 4

Wastewater from a storm water collection pond was tested in accordance with Example 2. The wastewater had a 01 of 8 and a turbidity of 93 NTU. The wastewater was treated with the coagulant prepared in Example 1 and chitosan. Data is shown in Table 4.

TABLE 4

| Sample | Treatment (ppm per dose) | Chitosan (ppm per dose) | Turbidity (NTU) |
| --- | --- | --- | --- |
| 1 | 0.7 | 0 | 36.4 |
| 2 | 1.3 | 0 | 35.3 |
| 3 | 2 | 0 | 34.4 |
| 4 | 3.3 | 0 | 29.8 |
| 5 | 6.6 | 0 | 24.6 |
| 6 | 8.7 | 0 | 24.3 |
| CE-1 | 0 | 100 | 93 |
| CE-2 | 0 | 200 | 93 |
| CE-3 | 0 | 400 | 93 |
| CE-4 | 0 | 800 | 93 |
| CE-5 | 0 | 900 | 67.1 |

The treatment for samples 1-6 shows decreased turbidity of the wastewater at lower doses than the chitosan treatment.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

What is claimed is:

1. A method for making a coagulant comprising polymerizing 2-methacryloyloxyethyltrimethyl ammonium methyl sulfate and chitosan in the presence of redox initiators, said redox initiators comprising an oxidizing agent and a reductant therein, and wherein said oxidizing agent is t-butyl hydroperoxide.

2. The method according to claim 1 wherein chitosan is present from about 5 percent by weight to about 30 percent by weight, based on the weight of the reactants.

3. The method according to claim 1 wherein 2-Methacryloyloxyethyltrimethyl ammonium methyl sulfate is present from about 25 percent by weight to about 75 percent by weight, based on the weight of the reactants.

4. The method according to claim 1 wherein the redox initiator is present from about 1 percent by weight to about 10 percent by weight based on the weight of the reactants.

5. The method according to claim 1 wherein the oxidizing agent is present from about 0.5 percent by weight to about 5 percent by weight, based on the weight of the reactants and the reductant is present from about 0.5 percent by weight to about 5 percent by weight, based on the weight of the reactants.

6. The method according to claim 1 wherein the reductant is selected from the group consisting of sodium metabisulfite, sodium hydrosulfate and sodium thiosulfate.

7. The method of claim 1, wherein polymerization is in the presence of an acid.

8. The method of claim 7, wherein the acid is selected from the group consisting of citric acid, acetic acid, methanesulfonic acid and sulfamic acid.

9. The method of claim 7, wherein the acid is present from about 10 percent by weight to about 50 percent by weight based on the weight of the composition.

10. The method of claim 1, wherein the polymerization is at an elevated temperature.

11. The method of claim 10, wherein the polymerization is at a temperature from about 40° C. to about 90° C.

* * * * *